United States Patent
Bharadwaj et al.

(10) Patent No.: US 10,816,655 B2
(45) Date of Patent: Oct. 27, 2020

(54) IN-PHASE (I) AND QUADRATURE (Q) IMBALANCE ESTIMATION IN A RADAR SYSTEM

(71) Applicant: Texas Instruments Incorporated, Dallas, TX (US)

(72) Inventors: Sachin Bharadwaj, Bangalore (IN); Karthik Subburaj, Bangalore (IN); Sriram Murali, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 336 days.

(21) Appl. No.: 15/638,106

(22) Filed: Jun. 29, 2017

(65) Prior Publication Data

US 2018/0156910 A1  Jun. 7, 2018

(30) Foreign Application Priority Data

Dec. 7, 2016  (IN) .............................. 201641041766

(51) Int. Cl.
*G01S 13/44* (2006.01)
*G06K 9/52* (2006.01)
(Continued)

(52) U.S. Cl.
CPC ........ *G01S 13/4427* (2013.01); *G01S 7/4004* (2013.01); *G01S 7/4056* (2013.01);
(Continued)

(58) Field of Classification Search
CPC ......... G01S 13/02; G01S 13/006; G01S 7/418
See application file for complete search history.

(56) References Cited

U.S. PATENT DOCUMENTS 3,950,750 A * 4/1976 Churchill .................. G01S 7/40
  342/174
4,003,054 A * 1/1977 Goldstone ............. G01S 7/4021
  342/174
(Continued)

OTHER PUBLICATIONS

S. Fouladifard and H. Shafiee, "A New Technique for Estimation and Compensation of IQ Imbalance in OFDM Receivers", The 8th International Conference on Communication Systems, Nov. 28, 2002, Singapore, pp. 224-228.
(Continued)

*Primary Examiner* — Bernarr E Gregory
(74) *Attorney, Agent, or Firm* — Brian D. Graham; Charles A. Brill; Frank D. Cimino

(57) ABSTRACT

A radar system is provided that includes transmission signal generation circuitry, a transmit channel coupled to the transmission generation circuitry to receive a continuous wave test signal, the transmit channel configurable to output a test signal based on the continuous wave signal in which a phase angle of the test signal is changed in discrete steps within a phase angle range, a receive channel coupled to the transmit channel via a feedback loop to receive the test signal, the receive channel including an in-phase (I) channel and a quadrature (Q) channel, a statistics collection module configured to collect energy measurements of the test signal output by the I channel and the test signal output by the Q channel at each phase angle, and a processor configured to estimate phase and gain imbalance of the I channel and the Q channel based on the collected energy measurements.

25 Claims, 3 Drawing Sheets

(51) Int. Cl.
*G01S 7/40* (2006.01)
*G01S 13/90* (2006.01)
*G06K 9/32* (2006.01)
*G01S 13/30* (2006.01)
*G01S 7/35* (2006.01)
*G01S 13/02* (2006.01)
*G01S 7/41* (2006.01)
*G01S 13/00* (2006.01)

(52) U.S. Cl.
CPC .......... *G01S 13/30* (2013.01); *G01S 13/9023* (2013.01); *G06K 9/3241* (2013.01); *G06K 9/522* (2013.01); *G01S 2007/356* (2013.01); *G01S 2007/4069* (2013.01); *G01S 2007/4082* (2013.01)

(56) References Cited

U.S. PATENT DOCUMENTS

| | | | | |
|---|---|---|---|---|
| 4,122,448 A | * | 10/1978 | Martin | G01S 7/288 330/52 |
| 5,105,195 A | * | 4/1992 | Conrad | G01S 7/4021 342/174 |
| 5,119,399 A | * | 6/1992 | Santos | H04L 27/364 332/103 |
| 5,150,128 A | * | 9/1992 | Kongelbeck | G01S 7/4021 342/102 |
| 5,241,316 A | * | 8/1993 | Pringle | G01S 7/34 342/62 |
| 5,369,411 A | * | 11/1994 | Lisle, Jr. | G01S 7/4021 342/194 |
| 6,144,333 A | * | 11/2000 | Cho | G01S 13/4427 342/149 |
| 7,555,051 B2 | * | 6/2009 | Zhang | H04L 27/3863 327/238 |
| 8,014,444 B1 | * | 9/2011 | Marino | H04L 27/3809 375/233 |
| 8,064,550 B2 | * | 11/2011 | Chrabieh | H04L 27/3863 375/141 |
| 8,428,175 B2 | * | 4/2013 | Chrabieh | H04B 17/20 375/295 |

OTHER PUBLICATIONS

Saverio Trotta, et al, "An RCP Packaged Transceiver Chipset for Automotive LRR and SRR Systems in SiGe BiCMOS Technology", IEEE Transactions on Microwave Theory and Techniques, vol. 60, No. 3, Mar. 2012, pp. 178-794.

Donald E. Berrick, "FM/CW Radar Signals and Digital Processing", AD-774, National Technical Information Service, Springfield, VA, Jul. 1973, pp. 1-22.

* cited by examiner

IN-PHASE (I) AND QUADRATURE (Q) IMBALANCE ESTIMATION IN A RADAR SYSTEM

CROSS-REFERENCE TO RELATED APPLICATIONS

This application claims benefit of India Provisional Patent Application Serial No. 201641041766, filed Dec. 7, 2016, which is incorporated herein by reference in its entirety.

BACKGROUND OF THE DISCLOSURE

Field of the Disclosure

Embodiments of the present disclosure generally relate to radar systems, and more specifically relate to in-phase (I) and quadrature (Q) imbalance estimation in radar systems.

Description of the Related Art

The use of embedded frequency modulated continuous wave (FMCW) radar systems in industrial and automotive applications is evolving rapidly. For example, embedded FMCW radar systems may be used in a number of applications associated with a vehicle such as adaptive cruise control, collision warning, blind spot warning, lane change assist, parking assist and rear collision warning. Further, embedded FMCW radar systems may be used in industrial or security applications such as tracking movement inside a house or building under surveillance and maneuvering a robot in a factory or warehouse.

Real-only, i.e., in-phase (I) only, baseband chains have commonly been used in embedded FMCW radar systems as the intermediate frequency (IF) signals produced from such a baseband contains all the necessary information for radar signal processing. However, complex baseband chains yielding both in-phase (I) and quadrature (Q) signal components provide better noise performance and permit monitoring of the image band for interference and other artifacts. However, complex baseband chains may have poor image rejection performance due to gain and/or phase imbalances between the I and Q components causing the fold back of image band onto the signal band and vice-versa. Any fold back component in the signal band may be detected as a ghost object while any fold back component in the image band may render the image band unusable. Deployment of several features such as interference detection and monitoring relies on having clean image band.

SUMMARY

Embodiments of the present disclosure relate to methods and apparatus for estimating in-phase (I) and quadrature (Q) imbalance in a radar system. In one aspect, a radar system is provided that includes transmission signal generation circuitry operable to generate a continuous wave signal, a transmit channel coupled to the transmission generation circuitry to receive the continuous wave test signal, the transmit channel configurable to output a test signal based on the continuous wave signal in which a phase angle of the test signal is changed in discrete steps within a phase angle range, a receive channel coupled to an output of the transmit channel via a feedback loop to receive the test signal, the receive channel including an in-phase (I) channel and a quadrature (Q) channel, a statistics collection module configured to collect energy measurements of the test signal output by the I channel and the test signal output by the Q channel at each phase angle, and a processor configured to estimate phase and gain imbalance of the I channel and the Q channel based on the energy measurements collected by the statistics collection module.

In one aspect, a radar system is provided that includes a radar transceiver integrated circuit (IC) including a plurality of receive channels, each receive channel including an in-phase (I) channel and a quadrature (Q) channel, wherein the radar transceiver IC is configurable when operated in a calibration mode to send a test signal to each receive channel in parallel in which a phase angle of the test signal is changed in discrete steps within a phase angle range, to collect energy measurements of the test signal output by the I channel and the Q channel of each receive channel at each phase angle, and to collect power measurements of the test signal for at least some of the phase angles, and a processor coupled to the radar transceiver IC to receive the energy measurements and the test signal power measurements, the processor configured to estimate phase and gain imbalance of the I channel and the Q channel of each receive channel based on the respective energy measurements and the test signal power measurements.

In one aspect, a method for estimation of gain and phase imbalance of an in-phase (I) channel and a quadrature (Q) channel of a receive channel of a radar system is provided that includes collecting energy measurements of a test signal from the I channel and the Q channel, wherein a phase angle of the test signal is changed in discrete steps within a phase angle range and an energy measurement is collected from the test signal of the I channel and the test signal of the Q channel at each phase angle, and estimating the gain and phase imbalance based on the energy measurements.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
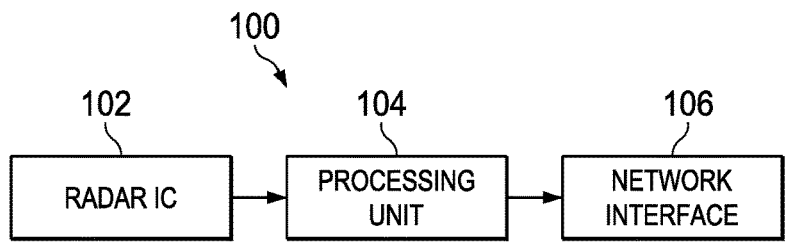
FIGS. 1, 2, and 3 are block diagrams of an example Frequency Modulated Continuous Wave (FMCW) radar system configured to perform in-phase (I) and quadrature (Q) imbalance estimation.

Specific embodiments of the disclosure will now be described in detail with reference to the accompanying figures. Like elements in the various figures are denoted by like reference numerals for consistency.

Embodiments of the disclosure provide for estimation of the in-phase (I) and quadrature (Q) gain and phase imbalance in the complex basebands of a radar system. For brevity, the gain and phase imbalance may be referred to collectively as the IQ imbalance herein. A phase controlled test radio frequency (RF) signal is generated internally and coupled into one or more receive channels having complex basebands. A phase shifter is employed to impart a series of phase changes to the test signal. The statistics of the signal from each of the one or more receive channels are collected for the various phase changes imparted to the test signal and are processed to estimate the IQ imbalance of the one or more receive channels. In some embodiments, a phase shifter in a transceiver chain is re-purposed to impart the phase changes. Approaches for minimizing the overall estimation time are also provided.

Figure 2:
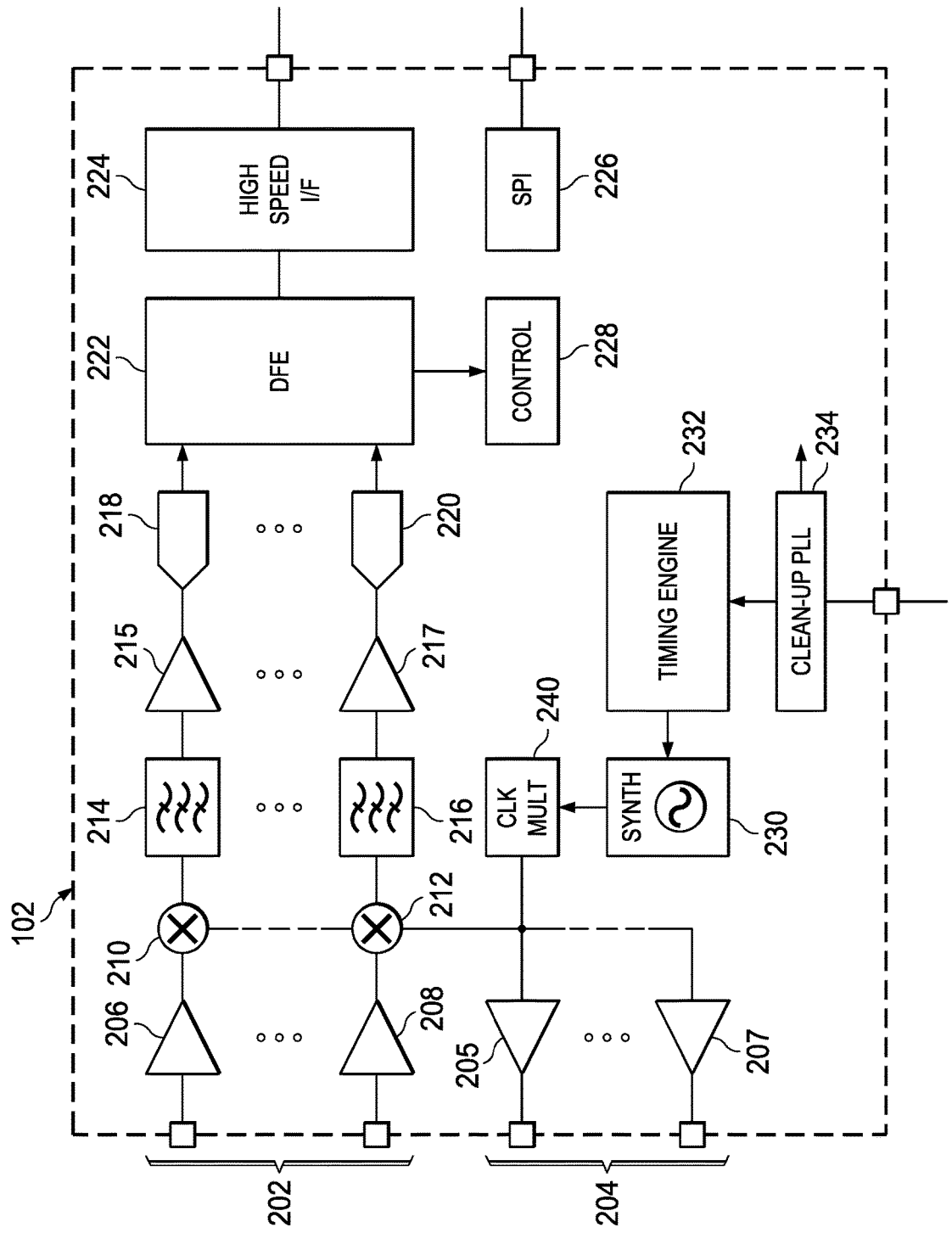
Figure 3:
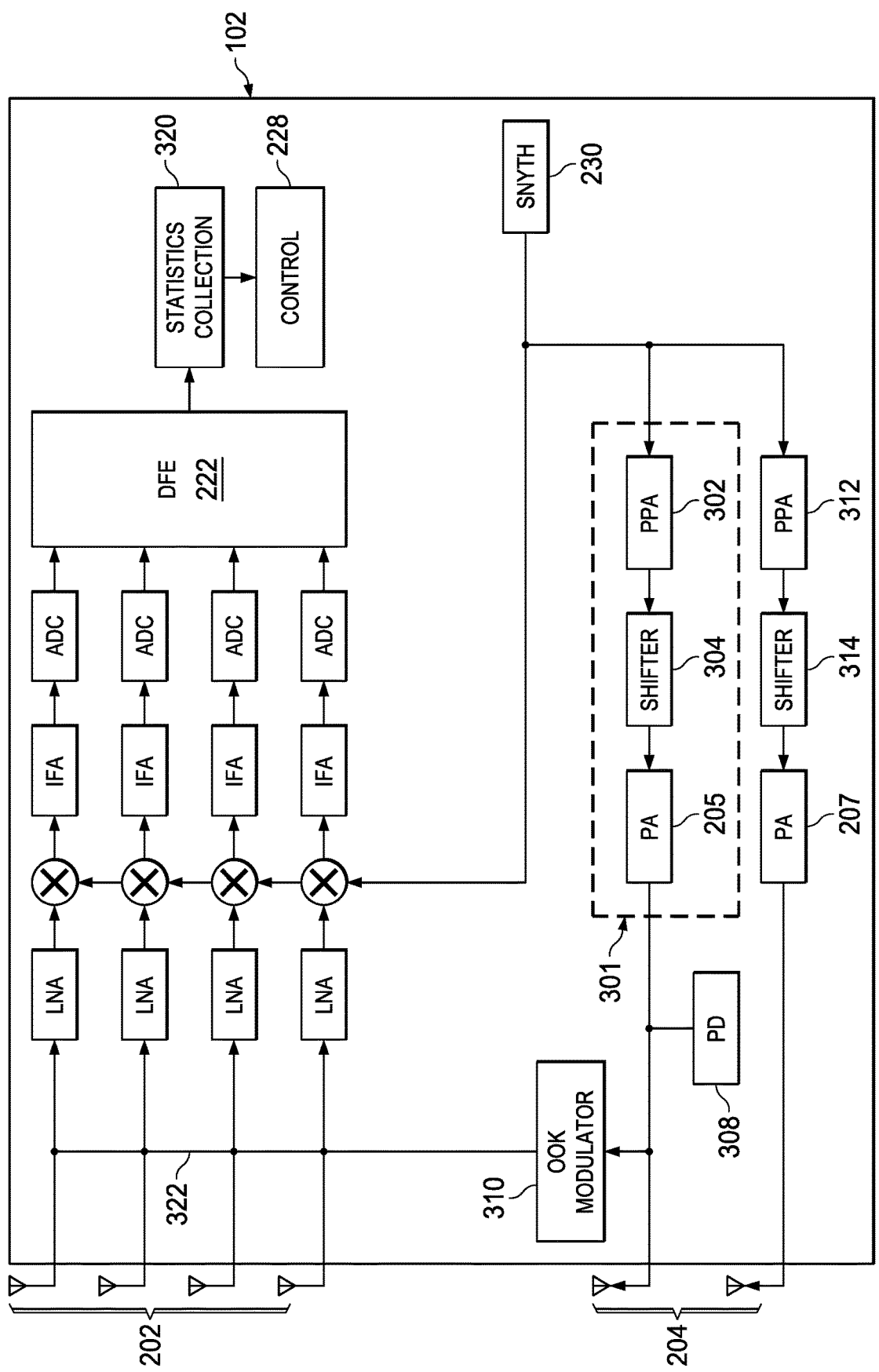

FIGS. 1, 2, and 3 are block diagrams of an example FMCW radar system 100 configured to perform IQ imbalance estimation for the complex basebands of the receive channels in the radar system 100. FIG. 1 illustrates the top level architecture of the radar system 100, FIG. 2 illustrates an example FMCW radar transceiver integrated circuit (IC) suitable for use in the radar system 100, and FIG. 3 provides a more detailed view of the configuration of the radar transceiver IC for IQ imbalance estimation.

Referring now to FIG. 1, the example FMCW radar system 100 illustrated is suitable for use in an embedded application. The radar system 100 includes a radar transceiver IC 102, a processing unit 104, and a network interface 106. The radar transceiver IC 102 is coupled to the processing unit 104 via a high speed serial interface. As is explained in more detail in reference to FIG. 2, the radar transceiver IC 102 includes functionality to generate multiple digital intermediate frequency (IF) signals (alternatively referred to as dechirped signals, beat signals, or raw radar signals) that are provided to the processing unit 104 via the high speed serial interface.

The processing unit 104 includes functionality to perform radar signal processing, i.e., to process the received radar signals to determine, for example, distance, velocity, and angle of any detected objects. The processing unit 104 may also include functionality to perform post processing of the information about the detected objects, such as tracking objects, determining rate and direction of movement, etc.

The processing unit 104 may include any suitable processor or combination of processors as needed for the processing throughput of the application using the radar data. For example, the processing unit 104 may include a digital signal processor (DSP), a microcontroller (MCU), an SOC combining both DSP and MCU processing, or a field programmable gate array (FPGA) and a DSP.

The processing unit 104 provides control information as needed externally via the network interface 106. The network interface 106 may implement any suitable protocol, such as, for example, the controller area network (CAN) protocol, the FlexRay protocol, or Ethernet protocol.

Referring now to FIG. 2, the radar transceiver IC 102 may include multiple transmit channels 204 for transmitting FMCW signals and multiple receive channels 202 for receiving the reflected transmitted signals. Any suitable number of receive channels and transmit channels may be used in embodiments. Further, the number of receive channels and the number of transmit channels may not be the same. For example, an embodiment of the radar transceiver IC 102 may have two transmit channels and four receive channels.

A transmit channel 204 includes a suitable transmitter coupled to an antenna. Further, the transmit channels 204 are identical and include a power amplifier 205, 207 coupled between the antenna and the SYNTH 230 to amplify the transmitted signal. A receive channel includes a suitable receiver and antenna. Further, each of the receive channels 202 are identical and include a low-noise amplifier (LNA) 206, 208 to amplify the received radio frequency (RF) signal, a complex mixer 210, 212 to mix the transmitted, i.e., local oscillator (LO), signal with the received RF signal to generate an intermediate frequency (IF) signal, a baseband bandpass filter 214, 216 for filtering the IF signal, a variable gain amplifier (VGA) 215, 217 for amplifying the filtered IF signal, and an analog-to-digital converter (ADC) 218, 220 for converting the analog IF signal to a digital IF signal. The bandpass filter, VGA, and ADC of a receive channel may be collectively referred to as the analog baseband, the baseband chain, the complex baseband, or the baseband filter chain. Further, the bandpass filter and VGA may be collectively referred to as an IF amplifier (IFA).

The receive channels 202 are coupled to the digital front end (DFE) component 222 to provide the digital IF signals to the DFE 222. The DFE 222, which may also be referred to as the digital baseband, may include functionality to perform decimation filtering on the digital IF signals to reduce the data transfer rate. The DFE 222 may also perform other operations on the digital IF signals, e.g., DC offset removal, digital compensation of non-idealities in the receive channels, such as inter-RX gain imbalance non-ideality, inter-RX phase imbalance non-ideality and the like. The DFE 222 is coupled to the high speed serial interface (I/F) 224 to transfer the digital IF signals (after processing in the DFE 222) to the processing unit 106 when the radar transceiver IC 102 is operated in normal mode.

The serial peripheral interface (SPI) 226 provides an interface for communication with the processing unit 106. For example, the processing unit 104 may use the SPI 226 to send control information, e.g., timing and frequencies of chirps, output power level, triggering of monitoring functions, etc., to the control module 228. The radar transceiver IC 102 may use the SPI 226, for example, to send test data to the processing unit 104.

The control module 228 includes functionality to control the operation of the radar transceiver IC 102 in normal mode and in calibration mode. The control module 228 may include, for example, a buffer to store output samples of the DFE 222, an FFT (Fast Fourier Transform) engine to compute spectral information of the buffer contents, and a microcontroller that executes firmware to control the operation of the radar transceiver IC 102. In some embodiments, the control module 228 includes functionality to estimate the IQ imbalance of the receive channels 202 when the radar transceiver IC 102 is operated in calibration mode. Operation of the control module 228 in calibration mode to determine the IQ imbalances is described in reference to the method of FIG. 4.

The programmable timing engine 232 includes functionality to receive chirp parameter values for a sequence of chirps in a radar frame from the control module 228 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (SYNTH) 230 includes functionality to generate signals for transmission based on chirp control signals from the timing engine 232. In some embodiments, the SYNTH 230 includes a phase locked loop (PLL) with a voltage controlled oscillator (VCO).

The clock multiplier 240 increases the frequency of the transmission signal (LO signal) to the LO frequency of the mixers 206, 208. The clean-up PLL (phase locked loop) 234 operates to increase the frequency of the signal of an external low frequency reference clock (not shown) to the frequency of the SYNTH 230 and to filter the reference clock phase noise out of the clock signal.

Referring now to FIG. 3, an embodiment of the radar transceiver IC 102 of FIG. 2 configured for estimation of IQ imbalances of the receive channels 202 is illustrated. As is explained in more detail below, to enable the IQ imbalance estimation, the radar transceiver IC 102 is configured to provide internal loopback of signals generated in a transmit channel to each of the receive channels 202 when the IC 102 is operated in a calibration mode. For simplicity of explanation, the depicted embodiment has four receive channels and two transmit channels. One of ordinary skill in the art will understand embodiments in which the number of receive channels and/or the number of transmit channels may differ.

The two transmit channels 204 each incorporate a signal power amplifier chain of a pre-power amplifier (PPA) 302, 312 coupled to the SYNTH 230 to receive a signal, a programmable shifter 304, 314 coupled to the PPA 302, 312 to receive the amplified signal, and a power amplifier (PA) 205, 207 coupled to the shifter 304, 314 to receive the shifted signal. A transmit antenna in each transmit channel is coupled to the respective PA 205, 207 to receive the amplified shifted signal for transmission.

A feedback loop 322 couples the output of the transmit channel 301 to the inputs of the receive channels 202. The feedback loop 322 may be enabled by the control module 228 when the IC 102 is operated in a calibration mode to provide test signals to the receive channels 202 to be used in estimating the IQ imbalance in each receive channel. A power detector 308 is coupled to the feedback loop 322 at the output of the transmit channel 301 to measure the test signal energy variation across phase shifts of the test signal. An on-off keying (OOK) modulator 310 is included in the feedback loop 322 to introduce an offset frequency into the IQ imbalance test signal.

A statistics collection module 320 is coupled to the DFE 222 to receive IQ imbalance test signals from each of the receive channels 202 when the radar transceiver IC 102 is operated in a calibration mode. The statistics collection module 320 includes functionality to measure the energy of the test signal from the I and Q channels of each receive channel 202 and to provide the energy measurements to the control module 228.

To estimate the IQ imbalance of each of the receive channels 202, the control module 228 causes the generation of a phase controlled RF test signal in the transmit channel 301. The test signal is presented to all the receive channels 202 via the feedback loop 322. The control module 228 causes phase changes in the RF test signal by programming the shifter 304 to vary the projection of the energy of the test signal in the receive channels 202. The statistics collection module 320 measures the energy of the test signal in each I and Q channel of each receive channel 202 for each phase change value and provides the measurements to the control module 228.

In addition, signal power measurements are collected from the PD 308 for some of the phase variations and provided to the control module 228. To generate the signal power measurements, the output of the power detector 308 is processed through a low noise amplifier and converted to digital samples that are averaged to determine power measurements corresponding to particular phase shift values. Any suitable number of digital samples may be averaged. The number of digital samples averaged to determine a power measurement for a particular phase shift value may depend on the signal to noise ratio required for estimation of the imbalance parameters.

The control module 228 then uses the respective I and Q channel energy measurements and the power measurements to estimate the IQ imbalance for each receive channel 202.

Figure 4:
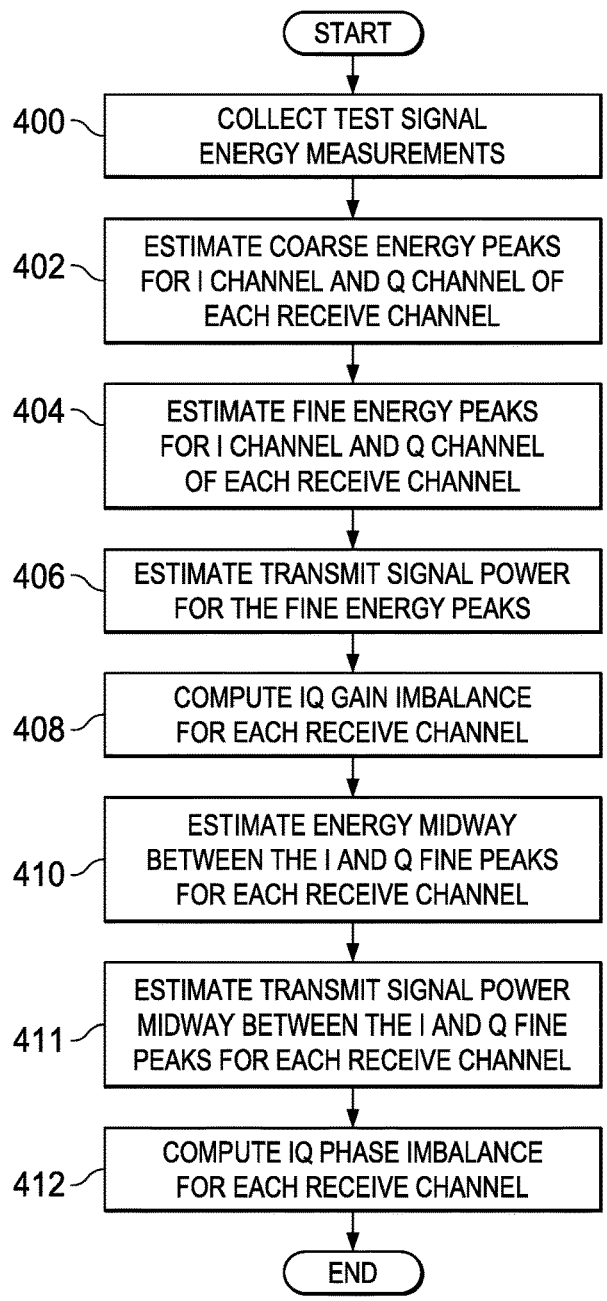
FIG. 4 is a flow diagram of a method for IQ imbalance estimation.

Estimation of IQ imbalance using these measurements is described herein in reference to the method of FIG. 4.

The estimation of the IQ imbalance of a receive channel 202 is derived as follows. The energy of the RF test signal varies as a function of phase shifter angles. Therefore, without the loss of generality, the PA 205 output can be modeled as $$\gamma(\theta_0)\cos(2\pi f_{LO}t) \qquad (1)$$

where t is the time during which the RF test signal is turned on, $\theta_0$ is the phase imparted by the transmit channel phase shifter 304, and $f_{LO}$ is the frequency of the RF test signal.

The PA 205 output signal passes through the on-off keying (OOK) modulator 310 which introduces an offset frequency in the test signal. Using (1), the output of the OOK modulator 310 is given by $$Y^{OOK}(t,\theta_0) = \gamma(\theta_0)\cos(2\pi f_{LO}t)*0.5*[e^{j2\pi f_{IF}t}+e^{-j2\pi f_{IF}t}]. \qquad (2)$$

The signal from the OOK modulator 310 passes through the receive channels 202, where the signal incurs receive gain and phase imbalances in each receive channel. The signal at the output of the mixer in a receive channel is given by $$Y^{MIX}(t,\theta_0) = \frac{Y^{OOK}(t,\theta_0)}{2}[(1+\alpha e^{j\phi})e^{j(2\pi f_{LO}t)} + (1-\alpha e^{-j\phi})e^{-j(2\pi f_{LO}t)}] \qquad (3)$$

where $\alpha$ is the receive gain imbalance and $\phi$ is the phase imbalance of a particular receive channel.

The signals output by each receive channel are filtered in the DFE 222 and provided to the statistics collection module 320. A receive channel signal at the input of the statistics collection module 320 is given by $$Y^{STATS}(t,\theta) = G*Y^{MIX}(t,\theta) \qquad (4)$$

where G is the overall unknown scale factor on the received signal. Note that $\theta_0$ in (4) is replaced by $\theta$ to emphasize that the signal goes through the group delay of all the components. Using (2) and (3), (4) can be simplified and decomposed into I channel and Q channel signals given by $$I(t) = 0.5G\gamma(\theta)\cos\theta \cos(2\pi f_{IF}t) \qquad (5)$$

$$Q(t) = 0.5\alpha G\gamma(\theta)\sin(\theta-\phi)\cos(2\pi f_{IF}t) \qquad (6)$$

The energies computed by the statistics collection module 320 are found by squaring (5) and (6) as given by $$\overline{I^2} = 0.25G^2\gamma^2(\theta)\cos^2\theta \cos^2(2\pi f_{IF}t) \qquad (7)$$

$$\overline{Q^2} = 0.25\alpha^2 G^2\gamma^2(\theta)\sin^2(\theta-\phi)\cos^2(2\pi f_{IF}t) \qquad (8)$$

where $\overline{I^2}$, $\overline{Q^2}$ are the I channel and Q channel energy, respectively, and $\alpha$, $\emptyset$ are the receive channel gain and phase imbalance to be estimated for the corresponding receive channel, G is an overall unknown scale factor on the received signal, and $f_{IF}$ is the offset frequency introduced by the OOK modulator 310.

The frequency shifter in the DFE 222 shifts the IF signals from the receive channels 202 to DC such that the statistics collection module 230 measures the DC bin energy which yields higher signal-to-noise ratios for estimation. The corresponding signal energies are given as follows $$\overline{I^2} = \frac{G^2\gamma^2(\theta)\cos^2\theta}{8} \qquad (9)$$

-continued $$\overline{Q}^2 = \frac{\alpha^2 G^2 \gamma^2(\theta) \sin^2(\theta - \phi)}{8} \quad (10)$$

Notice that I and Q channel energies in (9) and (10) have sinusoidal dependence upon θ which in turn can be controlled by changing the phase imparted by the phase shifter, $\theta_0$. Further, the energy also depends upon the transmit channel imperfections abstracted out as $\gamma^2(\theta)$, which can be calibrated using a power detector such as the PD 308 coupled in the feedback loop 322.

The above model illustrates the overall concept of determining IQ imbalance. However, transmit channel non-idealities may not be fully modeled as an IQ imbalance as the transmit channel may be a constant-envelope channel with compressing amplifier stages. However, embodiments do no rely on the model to be accurate as will be apparent to one of ordinary skill in the art from the description below.

FIG. 4 is a flow diagram of a method for estimating IQ imbalance in a receive channel. For example purposes, the method is described in reference to the IC 102. Initially, test signal energy measurements are collected 400 from the receive channels 202. To collect the test signal measurement, the control module 228 places the IC 102 in a calibration mode and configures the feedback loop 322 and other components as needed to gather test signal energy measurements. The control module 228 further causes the generation of a continuous wave (CVV) test signal that passes through the transmit channel 301 to the inputs of the receive channels 202 via the feedback loop 322.

The control module 228 then programs the shifter 304 to apply different phase angles to the test signal and causes the statistics collection module 320 to collect energy measurements for each receive channel for each phase angle. That is, the phase of the RF test signal is changed in discrete steps within a range and energy measurements are collected on the receive channels 202 simultaneously at each discrete step. The sweep range may be based, for example, on the maximum anticipated raw phase IQ imbalance and phase shifter non-linearity. For example, assuming a maximum raw phase imbalance of 30° and a 30° margin for phase shifter non-linearity, the phase angle should span a range of 180°+60°=240°. The step size within the range may be chosen to minimize interpolation error when estimating fine energy peaks (discussed below). For example, a step size of 15° may be used when a quadratic interpolation is used to estimate the fine energy peak.

Multiple power measurements of the signal output from the transmit channel 301 are also collected from the PD 308 at some of the phase steps. As previously mentioned, the measurements from the PD 308 are needed to account for test signal energy variation as a function of phase shift angles in computing the IQ imbalances. The number of measurements may be selected to minimize interpolation error. For example, assuming a phase shift range of 0° to 240° and a targeted error budget, a 30° phase step size for power measurements may be used. Accordingly, assuming a phase shift step size of 15°, the power measurement from the PD 308 may be captured at alternating phase shift steps.

In some embodiments, the phase shifter 304 is swept from 0° to 240° in 15° steps, for a total of seventeen steps. In such embodiments, the statistics collection module 320 collects thirty four energy measurements for each receive channel 202, seventeen for the I channel and seventeen for the Q channel. Further, the test signal power measurements are captured from the PD 308 at a 30° phase step size, i.e., nine power measurements are captured.

Referring back to FIG. 4, after the energy measurements are collected 400, the coarse energy peaks of the receive channels 202 are estimated 402. That is, for each receive channel 202, the control module 228 estimates a coarse energy peak for the I channel and a coarse peak for the Q channel from the energy measurements collected for the respective channels. In some embodiments, a coarse energy peak is defined as the largest of the energy measurements having an energy measurement at a previous phase angle and at a subsequent phase angle. In such embodiments, the first energy measurement and the last energy measurement of the sweep range cannot be the coarse peak. In some embodiments, all energy measurements in the sweep range may be considered in estimating the coarse energy peak.

The fine energy peaks for each of the receive channels 202 are then estimated 404 from the respective coarse energy peaks. That is, for each receive channel 202, the control module 228 performs an interpolation around the I channel coarse energy peak and an interpolation around the Q channel coarse energy peak to find the respective fine energy peaks. The control module 228 also performs interpolations of the phase angles of the two coarse energy peaks to determine the phase angles of the respective fine energy peaks. In some embodiments, quadratic interpolation is used. In some embodiments, other orders of interpolation may be used.

The test signal power for each of the fine energy peaks is then estimated 406 based on the power measurements collected from the PD 308. In some embodiments, for each fine energy peak, the control module 228 finds the power measurement taken at the phase angle closest to the phase angle of the fine energy peak and performs interpolation of the selected power measurement to estimate the test signal power at the fine energy peak. In some embodiments, quadratic interpolation is used. In some embodiments, other orders of interpolation may be used. For example, assume there are nine power measurements taken at a 30° phase step size in a phase angle sweep range from 0° to 240°. If the estimated phase angle of a fine peak is 65°, then the power measurement taken at the 60° phase angle is the closest. Quadratic interpolation using three power measurements around the 60° phase angle power measurement may be performed to estimate the power at the 65° phase angle of the fine peak.

The IQ gain imbalance for each receive channel 202 is then computed based on the respective I and Q channel fine peaks and the test signal power at those peaks. That is, the control module 228 computes the IQ gain imbalance for each receive channel as per $$\hat{\alpha} = \sqrt{\frac{\overline{Q}_{pk}^2 \gamma_{Ipk}^2(\theta_{Ipk})}{\overline{I}_{pk}^2 \gamma_{Qpk}^2(\theta_{Qpk})}} \quad (11)$$

where $\overline{I}_{pk}^2$ and $\overline{Q}_{pk}^2$ are the energies of the I and Q fine energy peaks, and $\gamma_{Ipk}^2(\theta_{Ipk})$ and $\gamma_{Qpk}^2(\theta_{Qpk})$ are the test signal power at the respective peaks.

The energy midway between the I and Q fine peaks for each receive channel 202 is also estimated 410 for computing the IQ phase imbalance of each receive channel. To perform this estimation, the control module 228 effectively "parks" the phase shifter "in the middle" such that significant energies are projected on both I and Q channels. That is, control module 228 estimates I and Q channel energies at a phase angle $\theta_{ph}$ midway between the estimated phase angles of the I and Q fine peaks as given by $$\theta_{ph} = \theta_{Ipk} + 0.5(\theta_{Qpk} - \theta_{Ipk})$$

where $\theta_{Ipk}$ and $\theta_{Qpk}$ are the estimated phase angles for the respective I and Q fine peaks. The control module 228 also estimates 411 the test signal power at the phase angle $\theta_{ph}$ for the I and Q channels. The estimation of the I and Q channel energies and the test signal power at the phase angle $\theta_{ph}$ may be performed as previously described herein for estimating the fine peaks and the associated test signal power.

The IQ phase imbalance for each receive channel 202 is then computed 412. That is, the control module 228 computes the IQ phase imbalance $\hat{\phi}$ for each receive channel 202 as per $$\hat{\theta} = a\cos\left(\sqrt{\frac{I_{ph}^2 \gamma_{Ipk}^2(\theta_{Ipk})}{I_{pk}^2 \gamma_{Iph}^2(\theta_{ph})}}\right), \hat{\theta} - \hat{\phi} = a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) \quad (12)$$

which using subtraction, yields $$\hat{\phi} = a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) - \hat{\theta} =$$

$$a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) - a\cos\left(\sqrt{\frac{I_{ph}^2 \gamma_{Ipk}^2(\theta_{Ipk})}{I_{pk}^2 \gamma_{Iph}^2(\theta_{ph})}}\right)$$

where $I_{ph}^2$, $\overline{Q}_{ph}^2$ are the I and Q channel energies at $\theta_{ph}$, respectively, and $\gamma_{Iph}^2(\theta_{ph})$, $\gamma_{Qph}^2(\theta_{ph})$ are the corresponding test signal powers.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, some embodiments have been described herein in which the IQ imbalance is computed for all receive channels. One of ordinary skill in the art will understand embodiments in which the IQ imbalance is computed for a selected subset of the receive channels rather than all the receive channels. One of ordinary skill in the art will also understand embodiments in which there is a single receive channel.

In another example, embodiments have been described herein in which test signal power is estimated using interpolation. One of ordinary skill in the art will understand embodiments in which no interpolation is performed and the power measurement of the closest phase angle is used.

In another example, embodiments have been described herein in which the computation of the IQ imbalances is performed by a control module on a radar transceiver IC. One of ordinary skill in the art will understand embodiments in which the computation is performed by another processor, e.g., an off-chip processor or another processor on the radar transceiver IC.

In another example, embodiments have been described in which the test signal is assumed to be a constant frequency.

One of ordinary skill in the art will understand embodiments in which the test signal is a modulated signal, e.g., an FMCW signal.

In another example, embodiments have been described herein in which power measurements from a power detector are used to abstract out any transmit channel imperfections in the IQ imbalance estimation. One of ordinary skill in the art will understand embodiments in which the power measurements are not needed as such measurements may only be needed when there is significant variation in the power level of the test signal as a function of the phase shifter angle. The possible power level variation depends on the circuit design, and thus may vary in significance across different systems. Also, depending on the target post-calibration residual IQ imbalance, any constant test signal power variation can be ignored if the variation is sufficiently small.

In another example, embodiments have been described herein in which the power measurements are captured using a power detector in the transmit path. One of ordinary skill in the art will understand embodiments in which the power measurements are captured using a power detector at the input of a receive path instead of in the transmit path.

In another example, embodiments have been described herein in which the output of the phase shifter in the transmit channel passes through a power amplifier and an OOK modulator. One of ordinary skill in the art will understand embodiments in which a binary phase modulator (BPM) is used instead of the OOK modulator and the power amplifier is not needed.

In another example, embodiments have been described herein in which only one transmit channel is configured to be used for estimation of IQ imbalance. One of ordinary skill in the art will understand embodiments in which more than one transmit channel may be configured to be used for estimation of IQ imbalance. In such embodiments, for each transmit channel that can be used for IQ imbalance estimation, a power detector is coupled between the output of the transmit channel and the modulator to provide the needed power measurements.

In another example, embodiments have been described herein in which the LO signal output by the SYNTH is provided to a PPA in a transmit channel and to the mixers in the receive channels. One of ordinary skill in the art will understand embodiments in which an LO distribution network is used. In general, an LO distribution network is a tree of cells that communicates the LO signal to the mixers of the receive channels and the shifter of the transmit channel. The cells may be, for example, wires or amplifiers such as the PPAs or frequency multipliers or frequency dividers.

In another example, embodiments have been described herein in which a clock multiplier is used. One of ordinary skill in the art will understand embodiments in which the multiplier is not needed because the SYNTH operates at the LO frequency rather than a lower frequency.

In another example, embodiments have been described herein in which the transmission signal generation circuitry is assumed to include a radio frequency synthesizer. One of ordinary skill in the art will understand embodiments in which this circuitry includes an open loop oscillator (radio frequency oscillator) plus a digital-to-analog converter (DAC) or other suitable transmission signal generation circuitry.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A radar system comprising:
   circuitry configured to generate a continuous wave signal;
   a transmit channel coupled to the circuitry, the transmit channel configured to:
      receive the continuous wave signal;
      generate a first test signal based on the continuous wave signal, the first test signal having a first phase angle; and
      generate a second test signal based on the continuous wave signal and the first test signal, the second test signal having a second phase angle, wherein the first phase angle and the second phase angle are in a phase angle range and a phase difference between the first phase angle and the second phase angle is a descrete step size;
   a receive channel coupled to an output of the transmit channel via a feedback loop, the receive channel configured to:
      receive the first test signal;
      generate a first in-phase (I) channel test signal in accordance with the first test signal;
      generate a first quadrature (Q) channel test signal in accordance with the first test signal;
      receive the second test signal;
      generate a second I channel test signal in accordance with the second test signal; and
      generate a second Q channel test signal in accordance with the second test signal;
   a statistics collection module coupled to the receive channel, the statistics collection module configured to:
      receive the first I channel test signal;
      measure energy of the first I channel test signal;
      receive the first Q channel test signal;
      measure energy of the first Q channel test signal;
      receive the second I channel test signal;
      measure energy of the second I channel test signal;
      receive the second Q channel test signal; and
      measure energy of the second Q channel test signal; and
   a control module coupled to the statistics collection module, the control module configured to determine phase and gain imbalance of the I channel and the Q channel based on the energy of the first I channel test signal, the energy of the first Q channel test signal, the energy of the second I channel test signal, and the energy of the second Q channel test signal.

2. The radar system of claim 1, further comprising a power detector coupled to the feedback loop, the power detector configured to measure power of the first test signal and power of the second test signal.

3. The radar system of claim 1, wherein the phase angle range is 0° to 240° and the discrete step is 15°.

4. The radar system of claim 1, wherein determining the phase and gain imbalance comprises:
   determining an I channel energy peak from the energy of the first I channel test signal and the energy of the second I channel test signal;
   determining a Q channel energy peak in accordance with the energy of the first Q channel test signal and the energy of the second Q channel test signal;
   determining a power of the first I channel test signal;
   determining a power of the first Q channel test signal;
   determining a power of the second I channel test signal;
   determining a power of the second Q channel test signal;
   determining an I channel power peak in accordance with the power of the first I channel test signal and the power of the second I channel test signal;
   determining a Q channel power peak in accordance with the power of the first Q channel test signal and the power of the second Q channel test signal; and
   computing the gain imbalance in accordance with the I channel energy peak, the Q channel energy peak, the I channel energy power peak, and the Q channel power peak.

5. The radar system of claim 4, wherein determining the I channel energy peak and the Q channel energy peak further comprises:
   determining an I channel coarse energy peak from the energy measurements of the I channel and of a Q channel coarse energy peak from the energy measurements of the Q channel; and
   interpolating around the I channel coarse energy peak and around the Q channel coarse energy peak to determine the respective I channel energy peak and Q channel energy peak.

6. The radar system of claim 5, wherein an order of the interpolation is quadratic.

7. The radar system of claim 5, wherein determination of an I channel coarse energy peak and a Q channel coarse energy peak comprises selecting a largest energy measurement from the respective energy measurements having a previous energy measurement and a subsequent energy measurement as the respective coarse energy peak.

8. The radar system of claim 4, wherein determining a test signal power measurement further comprises:
   determining a phase angle of the I channel energy peak and a phase angle of the Q channel energy peak based on phase angles at the discrete steps; and
   determining a test signal power measurement at the determined phase angle of the I channel energy peak and a test signal power measurement at the determined phase angle of the Q channel energy peak based on the test signal power measurements.

9. The radar system of claim 4, wherein determining the phase and gain imbalance further comprises:
   determining a phase angle of the I channel energy peak and a phase angle of the Q channel energy peak based on phase angles at the discrete steps;

determining I channel energy and Q channel energy at a first phase angle midway between the determined phase angle of the I channel energy peak and the determined phase angle of the Q channel energy peak;

determining test signal power measurements at the first phase angle based on the test signal power measurements; and computing the phase imbalance using $$\hat{\phi} = a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) - a\cos\left(\sqrt{\frac{\overline{I}_{ph}^2 \gamma_{Ipk}^2(\theta_{Ipk})}{\overline{I}_{pk}^2 \gamma_{Iph}^2(\theta_{ph})}}\right)$$

wherein $\theta_{ph}$ is the first phase angle, $\overline{I}_{ph}^2$, $\overline{Q}_{ph}^2$ are the respective determined I and Q channel energies at $\theta_{ph}$, and $\gamma_{Iph}^2(\theta_{ph})$, $\gamma_{Qph}^2(\theta_{ph})$ are the respective determined test signal power measurements at $\theta_{ph}$.

10. A radar system comprising:
a radar transceiver integrated circuit (IC) comprising receive channels, each receive channel comprising an in-phase (I) channel and a quadrature (Q) channel, wherein the radar transceiver IC is configured to send a test signal to the receive channels, in which a phase angle of the test signal is changed in discrete steps within a phase angle range, to collect energy measurements of the test signal output by the I channel and the Q channel of the receive channels at the phase angles, and to collect power measurements of the test signal for at least some of the phase angles; and a processor coupled to the radar transceiver IC, the processor configured to receive the energy measurements and the test signal power measurements, the processor configured to determine phase and gain imbalance of the I channel and the Q channel of the receive channels based on the energy measurements and the test signal power measurements.

11. The radar system of claim 10, wherein the processor is comprised in the radar transceiver IC.

12. The radar system of claim 10, wherein the radar transceiver IC further comprises:
a transmit channel coupled to the receive channels via a feedback loop, the transmit channel configured to output the test signal; and
a power detector coupled to the feedback loop, the power detector configured to measure power of the test signal output by the transmit channel.

13. The radar system of claim 10, wherein determining the phase and gain imbalance of a receive channel comprises:
determining an I channel energy peak from the energy measurements of the I channel and a Q channel energy peak from the energy measurements of the Q channel;
determining a test signal power measurement at the I channel energy peak and a test signal power measurement at the Q channel energy peak based on the test signal power measurements; and
computing the gain imbalance using $$\hat{\alpha} = \sqrt{\frac{\overline{Q}_{pk}^2 \gamma_{Ipk}^2(\theta_{Ipk})}{\overline{I}_{pk}^2 \gamma_{Qpk}^2(\theta_{Qpk})}}$$

wherein $\overline{I}_{pk}^2$ and $\overline{Q}_{pk}^2$ are respective energies of the I channel energy peak and the Q channel energy peak and $\gamma_{Ipk}^2(\theta_{Ipk})$ and $\gamma_{Qpk}^2(\theta_{Qpk})$ are respective determined test signal power measurements at the respective peaks.

14. The radar system of claim 13, wherein determining the phase and gain imbalance of a receive channel further comprises:
determining a phase angle of the I channel energy peak and a phase angle of the Q channel energy peak based on phase angles at the discrete steps;
determining I channel energy and Q channel energy at a first phase angle midway between the determined phase angle of the I channel energy peak and the determined phase angle of the Q channel energy peak;
determining test signal power measurements at the first phase angle based on the test signal power measurements; and
computing the phase imbalance using $$\hat{\phi} = a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) - a\cos\left(\sqrt{\frac{\overline{I}_{ph}^2 \gamma_{Ipk}^2(\theta_{Ipk})}{\overline{I}_{pk}^2 \gamma_{Iph}^2(\theta_{ph})}}\right)$$

wherein $\theta_{ph}$ is the first phase angle, $\overline{I}_{ph}^2$, $\overline{Q}_{ph}^2$ are the respective determined I and Q channel energies at $\theta_{ph}$, and $\gamma_{Iph}^2(\theta_{ph})$, $\gamma_{Qph}^2(\theta_{ph})$ are the respective determined test signal power measurements at $\theta_{ph}$.

15. The radar system of claim 13, wherein determining an I channel energy peak and a Q channel peak further comprises:
determining an I channel coarse energy peak from the energy measurements of the I channel and of a Q channel coarse energy peak from the energy measurements of the Q channel; and
interpolating around the I channel coarse energy peak and around the Q channel coarse energy peak to determine the respective I channel energy peak and Q channel energy peak.

16. The radar system of claim 15, wherein an order of the interpolation is quadratic.

17. The radar system of claim 15, wherein determining an I channel coarse energy peak and a Q channel coarse energy peak comprises selecting a largest energy measurement from the respective energy measurements having a previous energy measurement and a subsequent energy measurement as the respective coarse energy peak.

18. The radar system of claim 13, wherein determining a test signal power measurement further comprises:
determining a phase angle of the I channel energy peak and a phase angle of the Q channel energy peak based on phase angles at the discrete steps; and
determining a test signal power measurement at the determined phase angle of the I channel energy peak and a test signal power measurement at the determined phase angle of the Q channel energy peak based on the test signal power measurements.

19. The radar system of claim 10, wherein the phase angle range is 0° to 240° and each discrete step is 15°.

20. A method comprising:
outputting, by a transmit channel of a radar system, a first test signal having a first phase angle;
outputting, by the transmit channel, a second test signal, the second test signal having a second phase angle, wherein the first phase angle and the second phase angle are in a phase angle range and a phase difference between the first phase angle and the second phase angle is a discrete step size;

receiving, by a receive channel of the radar system, the first test signal;

generating, by the receive channel, a first in-phase (I) channel test signal in accordance with the first test signal;

generating, by the receive channel, a first quadrature (Q) channel test signal in accordance with the first test signal;

receiving, by the receive channel, the second test signal;

generating, by the receive channel, a second I channel test signal in accordance with the second test signal;

generating, by the receive channel, a second Q channel test signal in accordance with the second test signal;

receiving, by a statistics collection module of the radar system, the first I channel test signal;

measuring, by the statistics collection module, energy of the first I channel test signal;

receiving, by the statistics collection module, the first Q channel test signal;

measuring, by the statistics collection module, energy of the first Q channel test signal receiving, by the statistics collection module, the second I channel test signal;

measuring, by the statistics collection module, energy of the second I channel test signal;

receiving, by the statistics collection module, the second Q channel test signal;

measuring, by the statistics collection module, the energy of the second Q channel test signal; and determining, by a control module of the radar system, gain and phase imbalance of the I channel and the Q channel based on the energy of the first I channel test signal, the energy of the first Q channel test signal, the energy of the second I channel test signal, and the energy of the second Q channel test signal.

21. The method of claim 20, wherein the phase angle range is 0° to 240° and the discrete step is 15°.

22. The method of claim 20, further comprising collecting power measurements of the test signal for the first phase angle and the second phase angle, wherein determining the gain and phase imbalance further comprises using the test signal power measurements.

23. The method of claim 22, further comprising outputting, by a transmit channel of the radar system, by a feedback loop the first test signal and the second test signal.

24. The method of claim 22, wherein determining the gain and phase imbalance further comprises:

determining an I channel energy peak from the energy measurements of the I channel and a Q channel energy peak from the energy measurements of the Q channel;

determining a test signal power measurement at the I channel energy peak and a test signal power measurement at the Q channel energy peak based on the test signal power measurements; and computing the gain imbalance using $$\hat{\alpha} = \sqrt{\frac{\overline{Q}_{pk}^2 \gamma_{Ipk}^2(\theta_{Ipk})}{\overline{I}_{pk}^2 \gamma_{Qpk}^2(\theta_{Qpk})}}$$

wherein $\overline{I}_{pk}^2$ and $\overline{Q}_{pk}^2$ are respective energies of the I channel energy peak and the Q channel energy peak and $\gamma_{Ipk}^2(\theta_{Ipk})$ and $\gamma_{Qpk}^2(\theta_{Qpk})$ are respective determined test signal power measurements at the respective peaks.

25. The method of claim 24, wherein determining the gain and phase imbalance further comprises:

determining a phase angle of the I channel energy peak and a phase angle of the Q channel energy peak based on phase angles at the discrete steps;

determining I channel energy and Q channel energy at a first phase angle midway between the determined phase angle of the I channel energy peak and the determined phase angle of the Q channel energy peak;

determining test signal power measurements at the first phase angle based on the test signal power measurements; and computing the phase imbalance using $$\hat{\varphi} = a\sin\left(\sqrt{\frac{\overline{Q}_{ph}^2 \gamma_{Ipk}^2(\theta_{Qpk})}{\overline{Q}_{pk}^2 \gamma_{Qph}^2(\theta_{ph})}}\right) - a\cos\left(\sqrt{\frac{\overline{I}_{ph}^2 \gamma_{Ipk}^2(\theta_{Ipk})}{\overline{I}_{pk}^2 \gamma_{Iph}^2(\theta_{ph})}}\right)$$

wherein $\theta_{ph}$ is the first phase angle, $\overline{I}_{ph}^2$, $\overline{Q}_{ph}^2$ are the respective determined I and Q channel energies at $\theta_{ph}$, and $\gamma_{Iph}^2(\theta_{ph})$, $\gamma_{Qph}^2(\theta_{ph})$ are the respective determined test signal power measurements at $\theta_{ph}$.

* * * * *